(12) United States Patent
Shastry et al.

(10) Patent No.: US 9,331,559 B2
(45) Date of Patent: May 3, 2016

(54) KINETIC ENERGY HARVESTING METHODS AND APPARATUS

(71) Applicant: Stryde Technologies Inc., Evanston, IL (US)

(72) Inventors: Tejas Attreya Shastry, Evanston, IL (US); Michael Geier, Chicago, IL (US); Alexander Smith, Evanston, IL (US)

(73) Assignee: Stryde Technologies Inc., Evanston, IL (US)

( * ) Notice: Subject to any disclaimer, the term of this patent is extended or adjusted under 35 U.S.C. 154(b) by 0 days.

(21) Appl. No.: 14/606,279

(22) Filed: Jan. 27, 2015

(65) Prior Publication Data

US 2015/0214823 A1 Jul. 30, 2015

Related U.S. Application Data

(60) Provisional application No. 62/056,770, filed on Sep. 29, 2014, provisional application No. 62/001,634, filed on May 22, 2014, provisional application No. 61/932,417, filed on Jan. 28, 2014.

(51) Int. Cl.
*H02K 35/00* (2006.01)
*H02K 35/02* (2006.01)
(Continued)

(52) U.S. Cl.
CPC .............. *H02K 35/02* (2013.01); *H02J 7/328* (2013.01); *H02K 7/1876* (2013.01); *H02J 7/0042* (2013.01); *H02K 33/02* (2013.01); *H02K 33/18* (2013.01)

(58) Field of Classification Search
CPC ....... H02K 33/00; H02K 33/12; H02K 33/18; H02K 35/00; H02K 35/02; H02J 7/0042; H02J 7/328
USPC ........... 310/14, 17, 25, 15; 290/1 R; 362/192, 362/205
IPC ............................................ H02K 35/00, 35/02
See application file for complete search history.

(56) References Cited

U.S. PATENT DOCUMENTS 5,347,186 A * 9/1994 Konotchick ......... H02K 7/1876
310/17
5,818,132 A * 10/1998 Konotchick ........... H02K 35/02
290/1 R (Continued)

FOREIGN PATENT DOCUMENTS

WO        98/31090        7/1998

OTHER PUBLICATIONS

International Search Report issued Dec. 23, 2015, for corresponding Intl. Appln. No. PCT/US2015/052970 (13 pages).

*Primary Examiner* — John K Kim
(74) *Attorney, Agent, or Firm* — K&L Gates LLP

(57) ABSTRACT

A system, method, and apparatus for kinetic energy harvesting are disclosed. An example kinetic energy harvesting apparatus includes a tubular-shaped magnet housing, a first end-cap magnet configured to connect to a first end of the magnet housing and a second end-cap magnet configured to connect to a second end of the magnet housing. The apparatus also includes a first wire coil configured to be connected to the magnet housing between the first end and a center of the magnet housing and a second wire coil configured to be connected to the magnet housing between the second end and the center of the magnet housing. The apparatus further includes a central magnet configured to be located within the magnet housing between the first end and the second end such that the central magnet is suspended within the magnet housing.

25 Claims, 9 Drawing Sheets

(51) Int. Cl.
  *H02J 7/32* (2006.01)
  *H02K 7/18* (2006.01)
  *H02J 7/00* (2006.01)
  *H02K 33/18* (2006.01)
  *H02K 33/02* (2006.01)

(56) References Cited

U.S. PATENT DOCUMENTS

| | | | |
|---|---|---|---|
| 5,975,714 A | 11/1999 | Vetorino et al. | |
| 6,768,230 B2 * | 7/2004 | Cheung | F16C 33/1035 290/1 R |
| 6,798,090 B2 * | 9/2004 | Cheung | H02K 35/02 290/1 A |
| 6,809,427 B2 * | 10/2004 | Cheung | H02K 35/02 290/1 R |
| 7,449,803 B2 * | 11/2008 | Sahyoun | H02K 33/16 310/14 |
| 7,688,036 B2 * | 3/2010 | Yarger | H01M 6/5033 320/137 |
| 7,982,568 B2 * | 7/2011 | Fullerton | E05C 19/16 335/285 |
| 8,487,484 B1 * | 7/2013 | Miller, Jr. | H02K 49/102 310/12.14 |
| 8,947,185 B2 * | 2/2015 | Fullerton | E05C 19/16 335/285 |
| 2003/0155828 A1 * | 8/2003 | Cheung et al. | 310/90.5 |
| 2006/0208600 A1 * | 9/2006 | Sahyoun | H02K 33/16 310/254.1 |
| 2010/0283265 A1 * | 11/2010 | Rastegar | F21L 13/00 290/1 R |
| 2011/0193427 A1 | 8/2011 | Lemieux | |
| 2011/0210690 A1 * | 9/2011 | Vogel | 318/631 |
| 2014/0195180 A1 * | 7/2014 | Wojcik et al. | 702/63 |
| 2015/0214823 A1 * | 7/2015 | Shastry | H02K 7/1876 320/107 |

* cited by examiner

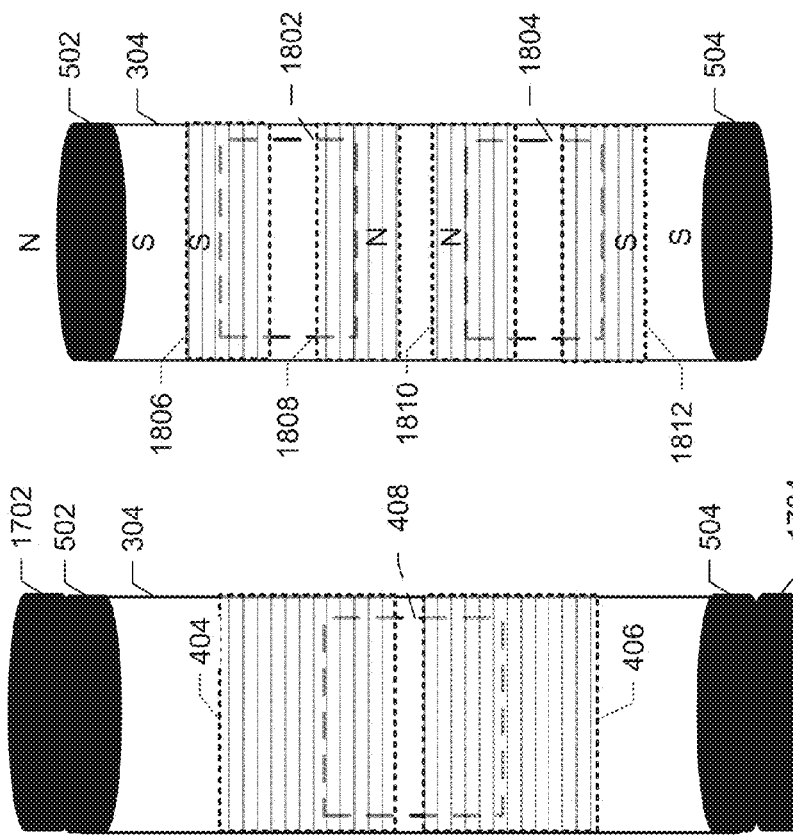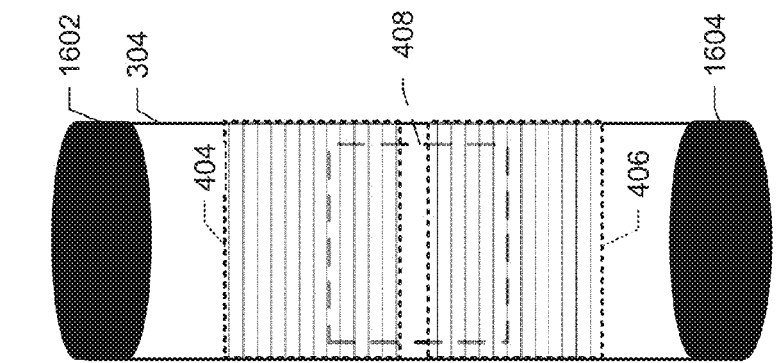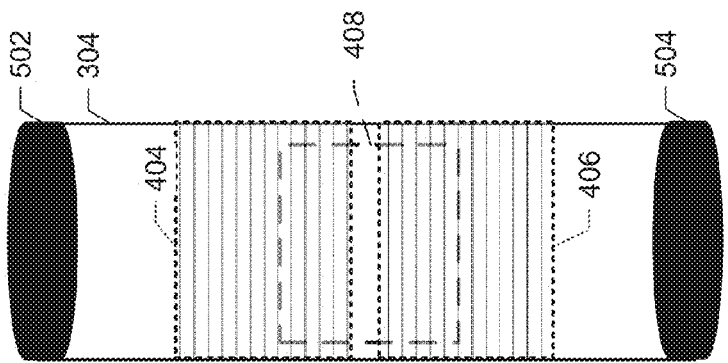

KINETIC ENERGY HARVESTING METHODS AND APPARATUS

PRIORITY CLAIM

The present application claims priority to and the benefit of U.S. Provisional Patent Application No. 61/932,417 filed on Jan. 28, 2014, U.S. Provisional Patent Application No. 62/001,634 filed on May 22, 2014, and U.S. Provisional Patent Application No. 62/056,770 filed on Sep. 29, 2014, the entirety of which are incorporated herein by reference.

BACKGROUND

Once considered a novelty or luxury, portable electronic devices have become prevalent throughout society. Billions of people own portable electronic devices including cellphones, smartphones, tablet computers, laptops, personal digital assistants, personal health meters, personal music players, or wearable cameras. As technology advances, the number and types of portable electronic devices is expected to increase significantly. For instance, smart eyewear and smartwatches are on the verge of becoming mainstream. One common thread among these devices is that they all operate on a battery that provides sufficient power ranging from a few hours to a few days.

Kinetic energy harvesting devices have been developed to provide a remote or portable source of energy for the billions of portable electronic devices. The goal of these energy harvesting devices is to extend the battery life of the portable devices when a user does not have ready access to an electrical outlet. Advertisements show kinetic energy harvesting devices being used on camping trips, travel to exotic locations, emergency situations, business meetings, and in a car/airplane. However, known kinetic energy harvesting devices have not become widely adopted because these devices are generally inefficient, ineffective, and/or cumbersome.

Generally, known kinetic energy harvesting devices use rotatory generators, thermoelectric technologies, or photovoltaic technologies to charge a battery or a portable device directly. However, each device requires a specific kinetic activity to adequately capture energy. For instance, some rotatory-based devices require a user to shake or make a swirling motion with their hand. Other energy harvesting devices are required to be strapped onto a user's shoe or worn on their wrist, which is oftentimes uncomfortable. These devices may adequately capture energy while a user is making the intended motion. However, users oftentimes become weary of making the same motion long enough for the device to capture enough energy. Really, how long is a user expected to rapidly shake their hand in public to supposedly charge a device!

Other energy harvesting devices such as thermoelectric and photovoltaic devices are configured to passively capture energy from heat, light, etc. While these devices are adequate for charging a wristwatch (not a smartwatch), these devices are not adequate or efficient enough to capture sufficient energy to charge a portable electronic device. Some manufacturers have attempted to improve energy harvesting by increasing the size of the energy harvesting actuator/transducer. However, the increased size reduces the portability and comfort of using/wearing these energy harvesting devices.

SUMMARY

The present disclosure provides a new and innovative system, method, and apparatus for harvesting kinetic energy. The system, method, and apparatus use at least one central magnet that is suspended within a tubular-shaped housing. The central magnet is configured to move through at least one inductor coil, thereby mirroring movement of a user. The movement of the magnet through the inductor coil generates a voltage used to charge a battery. A user may connect the battery to a portable electronic device (e.g., a smartphone) to accordingly charge the portable electronic device. The movement and/or oscillation of the central magnet may be regulated or controlled by adjustable (or detachable) end-cap magnets, which are placed on either side of the housing.

In an example embodiment, a kinetic energy harvesting apparatus includes a magnet housing configured to have a tubular shape, a first end-cap magnet configured to connect to a first end of the magnet housing, and a second end-cap magnet configured to connect to a second end of the magnet housing. The example apparatus also includes a first wire coil configured to be connected to the magnet housing between the first end and a center of the magnet housing and a second wire coil configured to be connected to the magnet housing between the second end and the center of the magnet housing. The apparatus further includes a central magnet configured to be located within the magnet housing between the first end and the second end such that a north-pole of the central magnet faces a north-pole of the first end-cap magnet and a south-pole of the central magnet faces a south-pole of the second end-cap magnet. This configuration causes the central magnet to be suspended between the first and second end-caps of the magnet housing.

Additional features and advantages of the disclosed system, method, and apparatus are described in, and will be apparent from, the following Detailed Description and the Figures.

BRIEF DESCRIPTION OF THE FIGURES

FIGS. 15 to 18 show diagrams of different configurations of end-cap magnets and a central magnet, according to example embodiments of the present disclosure.

DETAILED DESCRIPTION

The present disclosure relates in general to a method, apparatus, and system for kinetic energy harvesting and, in particular, to a method, apparatus, and system uses at least two inductor coils and a central magnet to capture kinetic energy. As disclosed herein, an example kinetic energy harvesting device or apparatus is configured to convert kinetic energy from a user into electrical energy to charge an internal battery. The kinetic energy harvesting device is configured to be connected to a portable electronic device so that the battery of the kinetic energy harvesting device charges a battery (or otherwise provides power to) the portable electronic device. The example kinetic energy harvesting device may be adjustable (or tunable) so that energy harvesting is optimized based on a user's activity level or personal characteristics.

Figure 1:
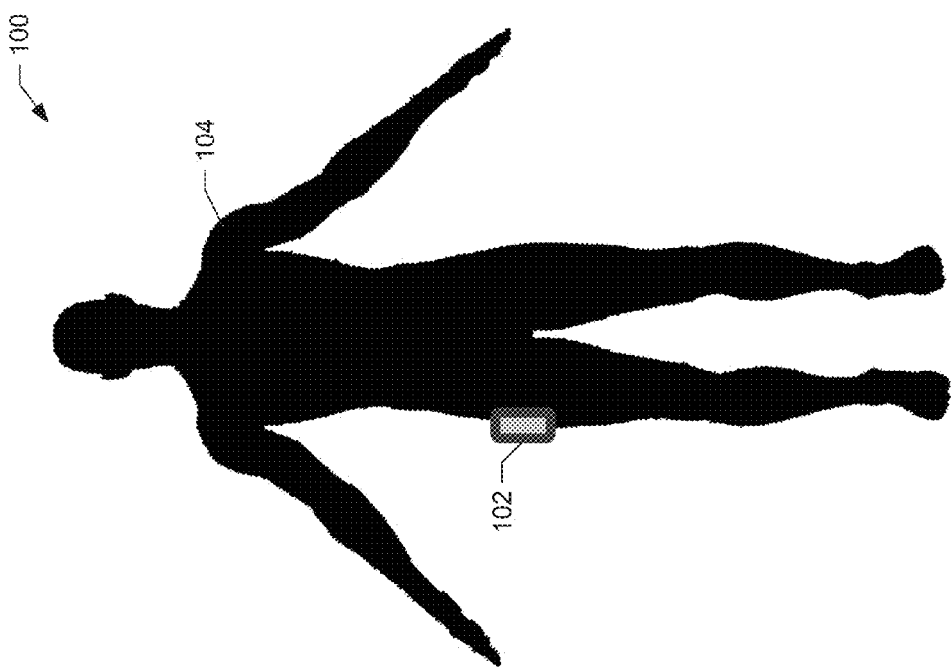
FIG. 1 shows a diagram of a kinetic energy harvesting device in an energy harvesting state, according to an example embodiment of the present disclosure.

The example kinetic energy harvesting device is operable in two states: an energy harvesting state 100 and a portable electronic device charging state 200. FIG. 1 shows a diagram of a kinetic energy harvesting device 102 in the energy harvesting state 100, according to an example embodiment of the present disclosure. In this state 100 a user 104 wears or otherwise possesses the kinetic energy harvesting device 102 while performing an activity. The activities may include running, walking, climbing, swimming, bicycling, sitting, sleeping, standing, bouncing in a chair, socializing, riding, playing a sport, having sex, etc.

Figure 2:
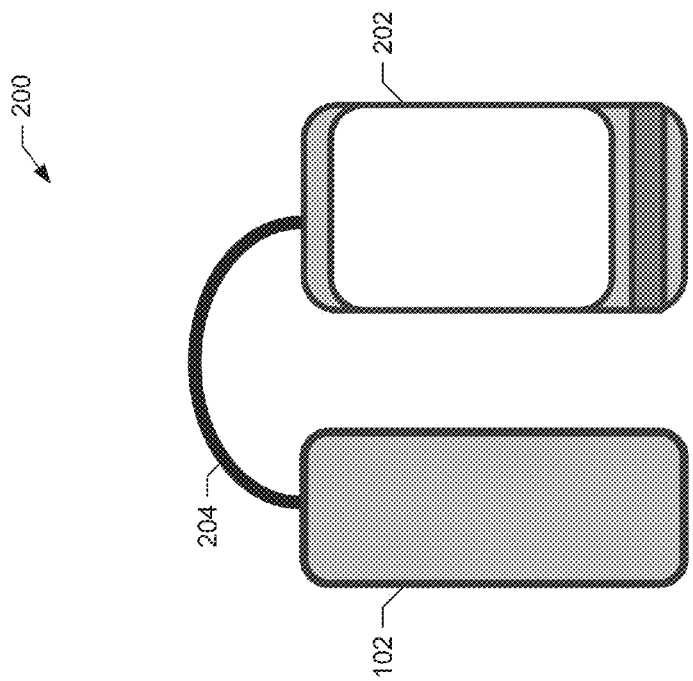
FIG. 2 shows a diagram of the kinetic energy harvesting device of FIG. 1 in a charging state, according to an example embodiment of the present disclosure.

As described in greater detail below, the kinetic energy harvesting device 102 includes one or more central magnets configured to move or oscillate based on the movement of the user 104. The central magnets are each located within a magnet housing that includes one or more inductive coils. Kinetic energy is harvested from the user's movement by the central magnets moving between the coils. The movement of the central magnets relative to the coils cause a change in the magnetic field exerted on the coils. The change in magnetic field produces an AC voltage across the coils, which is rectified into a DC voltage used to charge a battery. The charged battery may be connected to a portable electronic device 202 to accordingly charge the portable electronic device, as shown in FIG. 2. The example kinetic energy harvesting device 102 may charge its internal battery at a rate of 0.1 to 50% of battery life per hour based on the vigorousness of the user's activity.

It should be appreciated that placement of the kinetic energy harvesting device 102 on the hip of the user 104 provides relatively more energy harvesting (and is optimal for tracking human motion) because the hip area moves most significantly perpendicular to Earth's gravity. In other words, during the course of an activity, a user's hip moves the most in a height/vertical direction compared to other body parts of the user, which accordingly induces the greatest movement of the central magnets within the kinetic energy harvesting device 102. However, it should be appreciated that the kinetic energy harvesting device 102 has a form factor that enables it to be worn or placed virtually anywhere on a user. For example, the kinetic energy harvesting device 102 may be placed in a shirt or pants pocket of a user, on a belt of a user, connected to an arm, wrist, neck, chest, hip, leg, or foot of a user, placed within a bag carried by a user, placed on protective gear (e.g., a helmet, arm pads, knee pads, etc.) or athletic equipment (e.g., glasses, goggles, boots, shoes, etc.) worn by a user, and/or placed on a moveable object (e.g., a bicycle, skateboard, scooter, motorcycle, automobile, etc.) being ridden by a user. The kinetic energy harvesting device 102 may also be attachable to a pet (e.g., on a dog collar).

While reference throughout this disclose is made to use of the energy harvesting device 102 by a user to charge a portable electronic device, it should be appreciated that the kinetic energy harvesting device 102 may be used to charge other devices. For example, the example kinetic energy harvesting device 102 may be used to provide power to a hybrid or electric automobile/truck/bus/boat. The kinetic energy harvesting device 102 may also be used in aerospace applications, oceanic applications, medical applications, or any other application where portable self-contained power is desired/needed.

FIG. 2 shows a diagram of the kinetic energy harvesting device 102 in the portable electronic device charging state 200, according to an example embodiment of the present disclosure. In this state 200, the kinetic energy harvesting device 102 is electrically coupled to the portable electronic device 202 (e.g., a user device) via a wired connection 204. The portable electronic device 202 may include a cellphone, a smartphone, a tablet computer, a laptop, a personal digital assistant, a personal health meter, a personal music player, a wearable camera, smart-eyewear, a smartwatch, etc. The wired connection 204 may include, for example, a universal serial bus ("USB") connection, a micro-USB connection, an Apple® Lightning™ connection, a serial connection, or any other wired connection. While FIG. 2 shows the kinetic energy harvesting device 102 as having the one wired connection 204, it should be appreciated that the kinetic energy harvesting device 102 may include two or more wired connections 204.

In some embodiments, the kinetic energy harvesting device 102 may be configured to wirelessly charge the device 202. For example, the kinetic energy harvesting device 102 and the device 202 may each include inductors configured to wirelessly couple to facilitate the wireless transmission of power. The transmission may be through and/or in conjunction with a near field communication ("NFC") connection, a radio-frequency identification ("RFID") connection, etc. It should be appreciated that the use of wireless power charging enables more than one portable electronic device to be charged at a time.

Returning to FIG. 2, in the state 200 the example kinetic energy harvesting device 102 is configured to provide an electrical charge to the portable electronic device 202 via the wired connection 204. The electrical charge is used to charge a battery on the device 202. The electrical charge is typically between 3V and 4.2V but may range from 1V to 15V. Using, for example, a 1,000 milliampere-hour ("mAh") battery, the example kinetic energy harvesting device 102 is configured to charge the device 202 at a rate of 1% of battery life per minute, which is similar to the rate at which an electrical outlet charges user devices. In an alternative example, the kinetic energy harvesting device 102 may provide power to operate the portable electronic device 202.

Example Energy Harvesting Device

Figure 3:
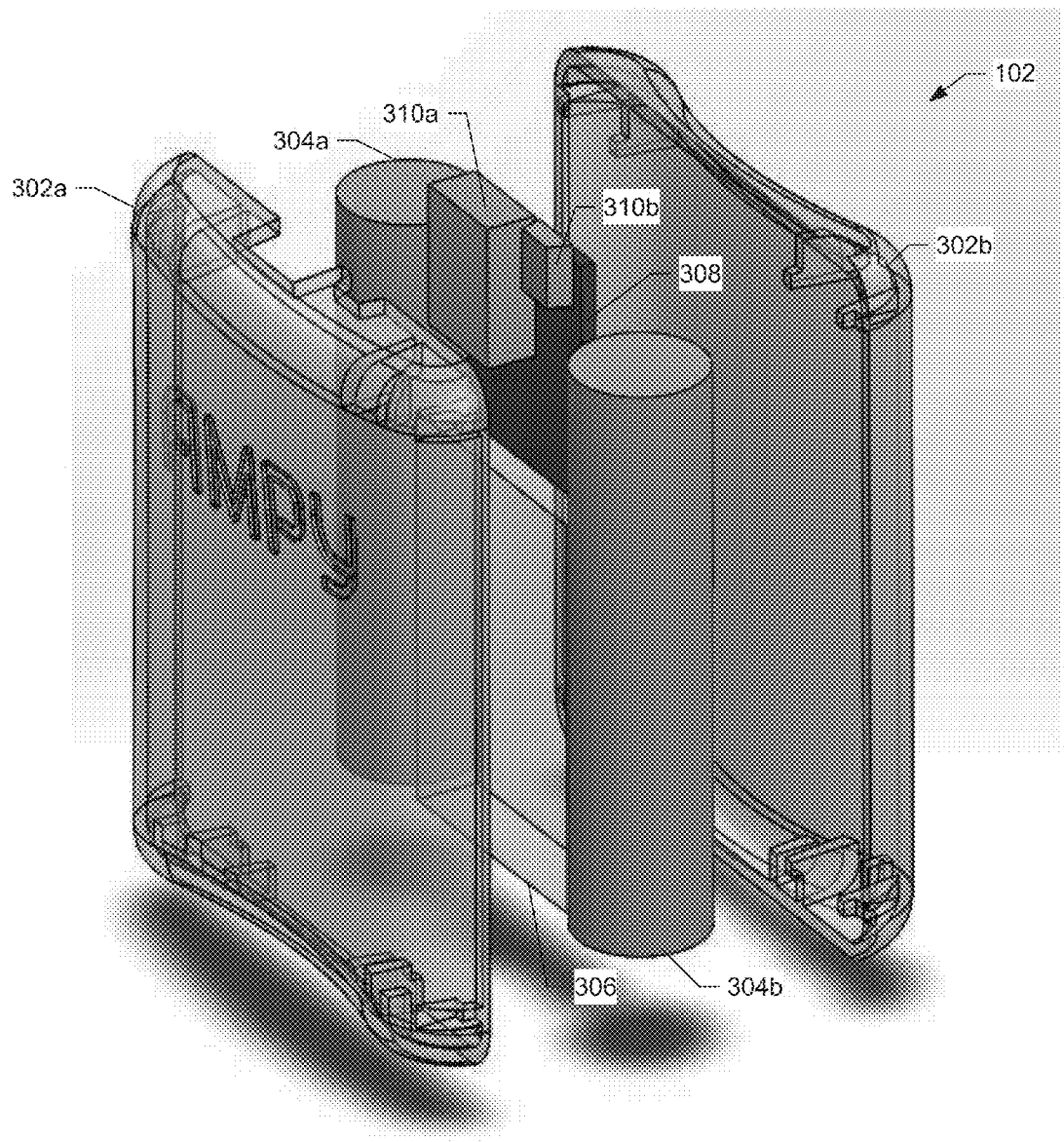
FIG. 3 shows a diagram of an exploded-view of the example kinetic energy harvesting device of FIGS. 1 and 2, according to an example embodiment of the present disclosure.

FIG. 3 shows a diagram of an exploded-view of the example kinetic energy harvesting device 102 of FIGS. 1 and 2, according to an example embodiment of the present disclosure. The example kinetic energy harvesting device 102 includes a device housing 302 configured to enclose at least one magnet housing 304, a battery 306, circuitry 308, and at least one electrical connection interface 310. The illustrated kinetic energy harvesting device 102 has a weight of 140 grams, similar to the weight of many personal electronic devices. It should be appreciated that FIG. 3 shows only one example of the kinetic energy harvesting device 102. In other embodiments, the kinetic energy harvesting device 102 may include additional or fewer magnet housings 304, additional batteries, additional connection interfaces, different dimensions, a different weight, etc.

The example device housing 302 includes a first side 302a and a second side 302b configured to connect together to enclose the components 304 to 310. The first side 302a and the second side 302b may comprise any type of plastic, polymer, rubber, carbon-fiber, wood, metal, etc. For instance, the first side 302a and the second side 302b may comprise acrylonitrile butadiene styrene ("ABS"), nylon, and/or a polycarbonate. In some instances, the device housing 302 may include a combination of materials including, for example, rubber and plastic. The first side 302a and the second side 302b are connected together to form a water-tight seal. Such a configuration protects the components 304 to 310 from water, dust, light, and other environmental substances.

The shapes and/or dimensions of the first side 302a and the second side 302b are configured to impart comfort for user wearability. For instance, the second side 302b includes an inner curved section configured to accommodate or conform to bulges in a user's legs, arms, or hip. The illustrated device housing 302 has a height of 2.5 inches, a width of 2.5 inches and a depth or thickness of 0.75 inches. It should be appreciated that the height, width, and/or depth of the kinetic energy harvesting device 102 may vary based on the size and/or number of the components 304 to 310, intended use (e.g., automotive, aerospace, personal, etc.), application, etc.

The example magnet housing 304 is configured to enclose force transducers for charging the battery 306. As described in more detail below in conjunction with FIG. 5, each of the magnet housings 304a and 304b are configured to have a tubular-shape capped at each end by end-cap magnets. The magnet housings 304a and 304b also include at least one wire coil (e.g., an inductor coil) and a central magnet. The wire coils are positioned to be adjacent to ends of the central magnet so that the central magnet passes through or in proximity to the wire coils when the central magnet oscillates between the end-cap magnets within the magnet housing 304. The poles of the end-cap magnets and the central magnet are configured to create a repulsion force to suspend the central magnet within the magnet housing 304. For instance, a south-pole of a first end-cap magnet is configured to face the south-pole of the central magnet and a north-pole of a second end-cap magnet is configured to face the north-pole of the central magnet.

Also, as disclosed in more detail below, the end-cap magnets may be replaced and/or supplemented to change the repulsion magnetic force with the central magnet, thereby changing a movement speed and oscillation of the central magnet. Further, in some embodiments, the wire coils may be adjusted based on the speed and oscillation of the central magnet so that the strongest magnetic field points on the central magnet pass through a center and/or a majority of the wire coils while moving the central magnet. Such configurations of the end-cap magnets and the wire coils enables the kinetic energy harvesting device 102 to be optimized for a user's activity and/or personal characteristics (e.g., gender, height, weight, etc.).

The example magnet housing 304 may comprise ABS, nylon, a polycarbonate, etc. An interior surface of the magnet housing 304 may be smoothed and/or coated to reduce friction of the central magnet contacting the inner walls of the magnet housing 304 while moving. In one embodiment, the coating may include a graphite powder or film.

Figure 19:
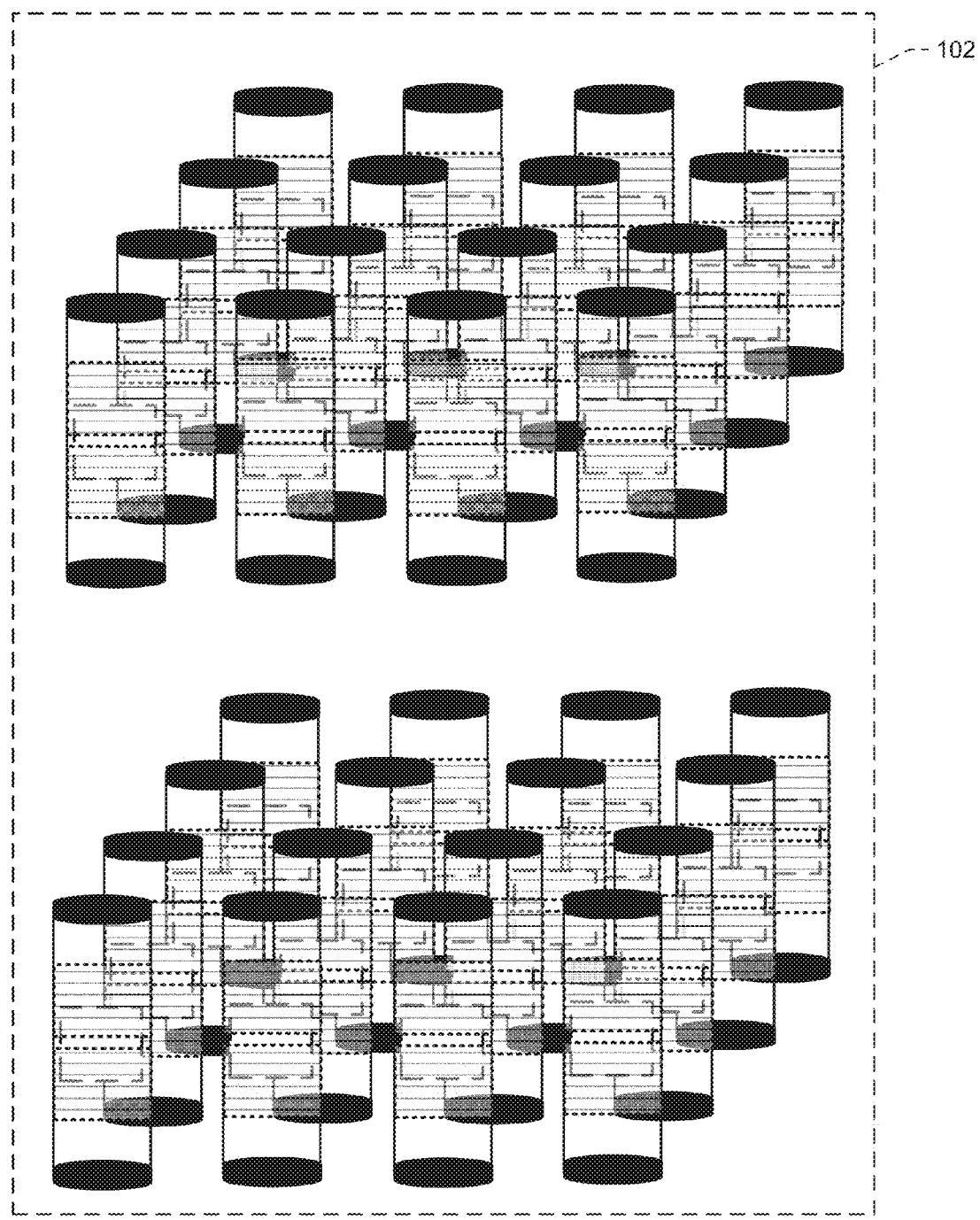
FIG. 19 shows a diagram where an array of relatively small central magnets is used within one or more magnet housings, according to example embodiments of the present disclosure.

While FIG. 3 shows the magnet housings 304a and 304b, it should be appreciated that the kinetic energy harvesting device 102 may include fewer or additional magnet housings. For example, the kinetic energy harvesting device 102 may have as few as one magnet housing or as many as 1,000 to 10,000 magnet housings (as shown in FIG. 19) based, for example, on an application of the kinetic energy harvesting device 102, technology constraints, etc. For instance, the kinetic energy harvesting device 102 may be used in an automotive application to provide power to an automobile and include hundreds of magnet housings. Alternatively, the size of the magnet housing 304 may change based on application or technology. For example, larger magnet housings may be used to accommodate larger central magnets or smaller magnet housings may be used to enclose micro or nano-sized magnets for microelectromechanical systems ("MEMS")-based applications.

As mentioned above, the example battery 306 is configured to store 1,000 mAh. In other examples, the battery 306 may be configured to store less or additional charge. Further, while the single battery 306 is shown, it should be appreciated that two or more batteries may be used. Multiple batteries may be connected in series and/or parallel to distribute charge. The battery 306 may by of any chemistry including nickel cadmium, nickel metal hydride, lithium ion, etc. In some instances, the battery 306 may be replaced and/or supplemented by a capacitor or inductor. The capacitor may include a super-capacitor, an ultra-capacitor, or an electrolytic capacitor. The battery 306 may include circuitry to monitor (or control) temperature, charge rate, discharge rate, and/or stored energy. For instance, the battery 306 may include a current sensor and a switch configured to disconnect the battery 306 if a charge rate or discharge rate exceeds a threshold.

The example circuitry 308 is configured to rectify an AC voltage from the inductive wire coils within the magnet housing 304 into a DC voltage used to charge the battery 306. As discussed in more detail in conjunction with FIG. 4, the example circuitry 308 may also include one or more controllers to manage or control the charge/discharge of the battery 306. A discharge controller may also transform voltage/current from the battery 306 into an electrical signal for transmission via the wired connection 204 (and corresponding interfaces) to the portable electronic device 202. The circuitry 308 may further include a processor configured to monitor or determine a rate of charge/discharge and/or a charge level of the battery 306. The processor may be configured to communicate wirelessly the rate and/or charge level to a portable electronic device of a user.

The example connection interface 310 is configured to connect or otherwise electrically couple the kinetic energy harvesting device 102 with a portable electronic device. The illustrated connection interface 310 includes a USB interface 310a and a micro-USB interface 310b. In other embodiments, the connection interface 310 may include additional or fewer interfaces, such as, for example, an Apple® Lightning™ interface. In yet alternative embodiments, the connection interface 310 may include a wireless interface (e.g., one or more inductors) to transmit the power wirelessly to a personal electronic device. In these alternative embodiments, the connection interface 310 may be configured to communicate with (or otherwise detect) a portable electronic device prior to wirelessly transmitting power from the battery 306.

Figure 4:
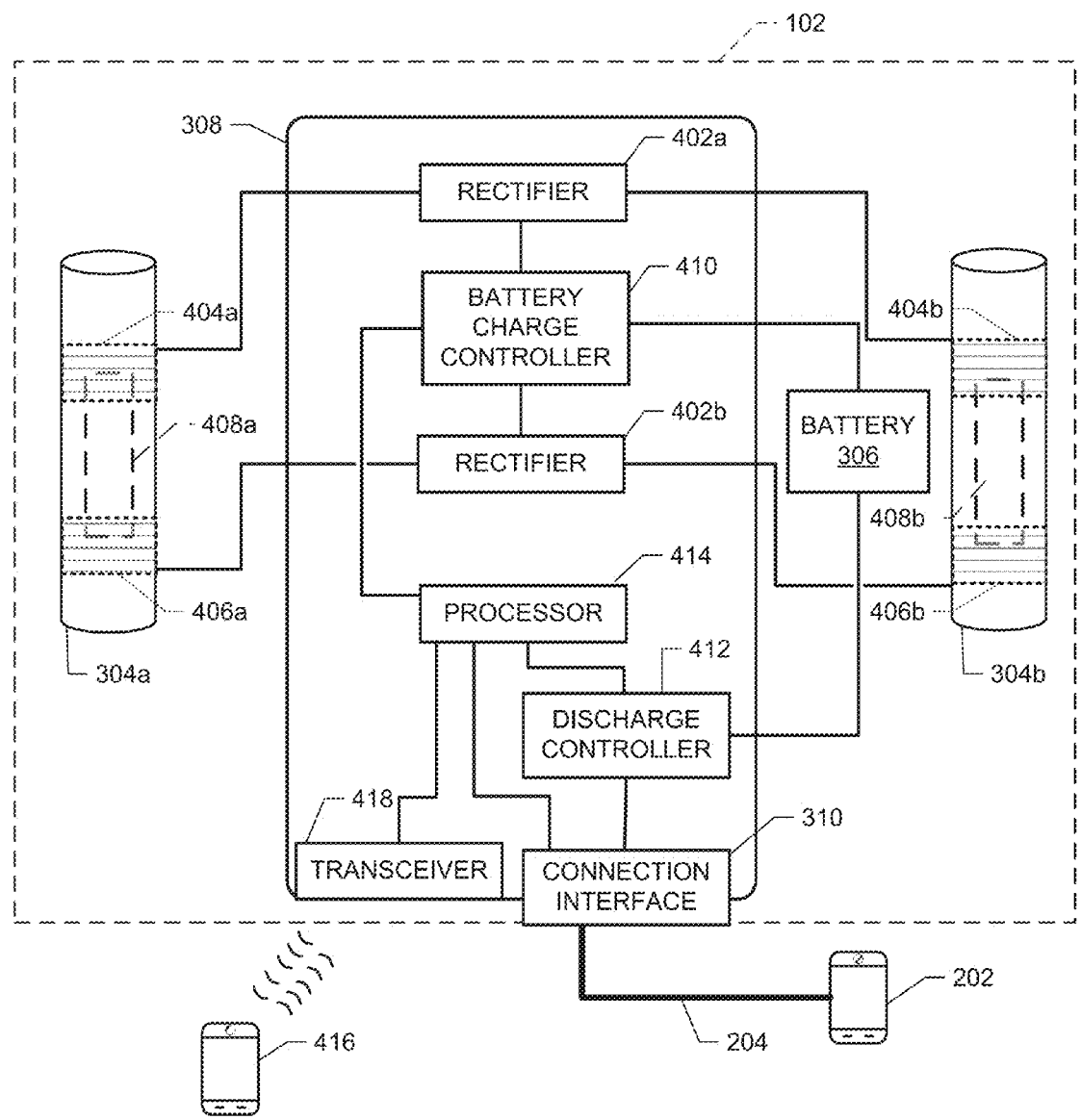
FIG. 4 shows a diagram of circuitry of the example kinetic energy harvesting device of FIGS. 1 to 3, according to an example embodiment of the present disclosure.

FIG. 4 shows a diagram of the circuitry 308 of FIG. 3, according to an example embodiment of the present disclosure. As discussed above, the circuitry 308 within the kinetic energy harvesting device 102 is electrically connected to the wire coils and the battery 306. The illustrated circuitry 308 is only one example as to how an AC voltage from the wire coils is converted into a DC voltage, stored to the battery 306, monitored, and discharged from the battery 306. Other embodiments may include additional or fewer analog and/or digital components and/or surface mount components (e.g., resistors, capacitors, diodes, amplifiers, etc.).

Figures 6, 7:
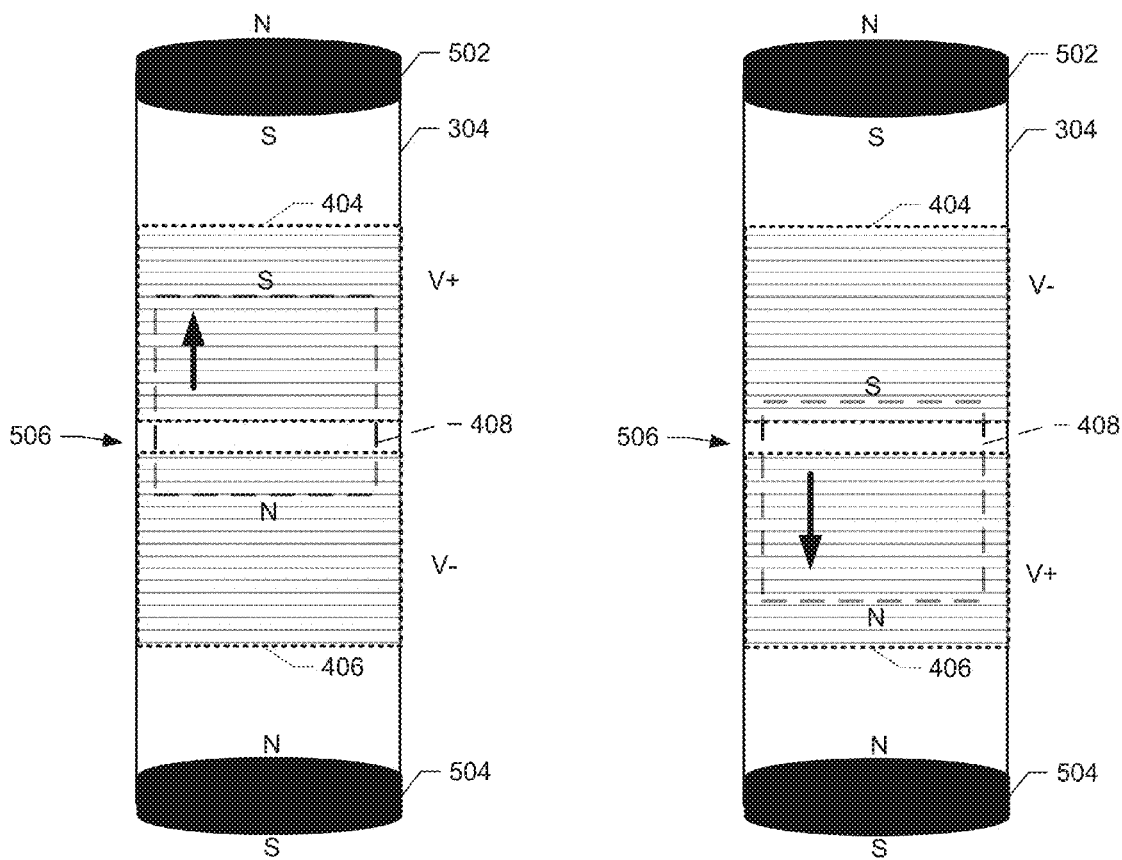
FIGS. 6 and 7 show diagrams of current generation within wire coils as a central magnet oscillates, according to an example embodiment of the present disclosure.

The example circuitry 308 includes rectifiers 402a and 402b to convert an AC voltage or signal from inductive wire coils 404 and 406 of the magnet housing 304 into a DC voltage. Each of the magnet housings 304 includes the two inductive wire coils 404 and 406. A first wire coil 404 is positioned at a first end of a central magnet 408 in a resting position and the second wire coil 406 is positioned at a second end of the central magnet 408. During movement of the central magnet 408, current is generated in the wire coils from electromagnetic coupling with the central magnet. The current causes a voltage to form across the wire coils 404 and 406. As shown in FIGS. 6 and 7, a movement of the central magnet 408 toward the first wire coil 404 generates a positive voltage across the first wire coil 404 and a negative voltage across the second wire coil 406. Likewise, movement of the central magnet 408 toward the second wire coil 406 generates a negative voltage across the first wire coil 404 and a positive voltage across the second wire coil 406. Summing the voltage outputs from the first and second wire coils 404 and 406 would cancel the positive and negative voltages, thereby generating zero net voltage. Accordingly, the first and second wire coils 404 and 406 are rectified separately so that the positive and negative voltages may separately be used to charge the battery 306.

As shown in FIG. 4, the rectifier 402a is electrically coupled to the first wire coils 404a and 404b and the rectifier 402b is electrically coupled to the second wire coils 406a and 406b. Such a configuration assumes that the central magnets 408a and 408b are magnetically aligned vertically or coupled to move in the same direction at the same time. For instance, a north-pole of the central magnet 408a may be aligned with a south-pole of the central magnet 408b, thereby coupling the magnets 408 and ensuring that the rectifiers 402 receive the same positive or negative voltage from each of the magnet housings 304.

The voltages from the wire coils 404a and 404b may be connected in series and summed prior to being rectified by the rectifier 402a. Alternatively, the voltage from the wire coils 404a and 404b may be separately rectified by rectifiers connected in series. The resulting rectified DC voltages are summed or otherwise combined. Likewise voltages from the wire coils 406a and 406b may be connected in series and summed prior to be rectified by the rectifier 402b or separately by respective rectifiers. In yet alternative embodiments, a voltage inventor may be connected to one of the first wire coil 404a or the second wire coil 406a to enable voltages from the wire coils 404a and 406a (and 404b and 406b) to be summed without cancellation.

After rectification, a battery charge controller 410 is configured to store the DC voltage to the battery 306. The battery charge controller 410 may include a current sensor, a voltage detector, a temperature sensor, one or more switches, and/or one or more inverters. The current sensor is configured to determine a current flowing into (or out of) the battery 306 and may include one or more current mirrors. The voltage sensor is configured to detect a voltage being applied to the battery 306 for charging and/or detect a current charge level of the battery 306. The voltage sensor may also be configured to detect voltage levels within individual cells of the battery 306 to enable the controller 410 to control uniform charging among the cells. The temperature sensor is configured to monitor a temperature of the battery 306. The switches (e.g., mechanical switches or transistors) are configured to connect/disconnect the battery 306 from charging. The inverters may be used to convert a negative DC voltage into a positive voltage for charging the battery. The sensors, switches, and/or inventors may be implemented with passive components, active digital/analog components or a combination thereof.

The current, voltage, and temperature sensors may be used to enable the controller 410 to monitor the rate at which the battery 306 is charged to prevent damage from overcurrent conditions. The battery charge controller 410 may also use the sensors to limit the charge rate when the battery 306 is close to capacity and prevent additional charge from being added when the battery 306 is full. The controller 410 may cause switches to actuate to disconnect the battery 306 from being charged. During operation, the controller 410 receives a positive DC voltage from one of the rectifiers 402 and a negative DC voltage from the other of the rectifiers 402. The controller 410 is configured to charge the battery 306 with the positive DC voltage while converting or inverting the negative DC voltage. The controller 410 then charges the battery 306 with the inverted positive DC voltage. In some instances, the negative DC voltage may be inverted and combined with the positive DC voltage prior to being used to charge the battery 306. In other instances, the controller 410 may be configured to filter or disregard the negative DC voltage.

The example discharge controller 412 is configured to discharge current and/or voltage from the battery 306 to charge a portable electronic device 202. The discharge controller includes a current sensor, a voltage detector, a temperature sensor, one or more switches, and/or one or more voltage regulators/converters. The current, voltage, and temperature sensors and switches are configured to perform the same operations as described in conjunction with the battery charge controller 410. For example, the current sensor is configured to measure a discharge current from the battery 306. In some embodiments the discharge controller 412 may be included within and/or the same component as the battery charge controller 410.

The example voltage regulator/converter of the discharge controller 412 is configured to convert the current and/or voltage from the battery 306 into one or more electrical signals for transmission via the wired connection 204. The discharge controller 412 may include logic or computer readable instructions that specify what voltage is to be output based, for example, on which interface is being used or a type of portable electronic device 202. For instance, the discharge controller 412, after sensing a connection of the portable electronic device 202 to a USB interface of the connection interface 310, converts current discharged from the battery 306 into a voltage signal compatible with USB standards.

The discharge controller 412 may also be configured to disconnect the battery 306 from discharging current when a portable electronic device 202 is not present (or connected) and/or when the remaining charge on the battery 306 reaches a specified threshold (e.g., 10%). In instances where the discharge controller 412 prematurely ends the charging of the portable electronic device 202 due to low charge levels on the battery 306, the discharge controller 412 may be configured to transmit a message to the portable electronic device 202 indicating that charging has stopped. The portable electronic device 202 may display the contents of the message to a user.

The example circuitry 308 of FIG. 4 may also into a processor 414 configured to communicate information about the kinetic energy harvesting device 102. The processor 414 may communicate with the portable electronic device 202 via the connection interface 310 in conjunction with the discharger controller 412 charging the device 202. Additionally or alternatively, the kinetic energy harvesting device 102 may be configured to communicate with another portable electronic device 416 that is not being charged. For instance, the processor 414 may be communicatively coupled to (or include) a transceiver 418 that enables wireless communication (e.g., NFC, RFID, Bluetooth®, Wi-Fi, etc.) with the other portable electronic device 416.

The example processor 414 is configured to communicate with the battery charge controller 410 and/or the discharge controller 412 to receive or otherwise determine a charge/discharge rate of the battery 306, a charge level of the battery 306, one or more detected fault conditions of the battery 306, one or more detected fault conditions associated with the magnet housing 304, etc. For example, the processor 414 and/or the charge controller 410 may determine that one of the magnet housings 304 is experiencing an issue when voltage is received from, for example, the housing 304a but is not received (or less voltage is received) from the housing 304b.

The processor 414 is configured to transmit the battery charge/discharge rate information, the charge available information, and fault information to one of the devices 416 and 202. In some embodiments, the processor 414 may include one or more algorithms or machine readable instructions to determine the charge/discharge rate based on current sensor measurements provided by the controllers 410 and 412. The processor 414 may also include one or more algorithms or instructions to determine an activity of a user or calories burned performing an activity.

In some embodiments, the processor 414 may include one or more algorithms configured to determine an amount of time for a user to perform an activity (based on detected charging rates of the battery 306) to reach a specified or threshold battery charge level. For example, the processor 414 may detect that a user is walking and transmit a message to the device 416 indicating that walking 10,000 steps would generate enough power to charge the device 416 for 3 hours or another smaller device such as a smartwatch or fitness tracker (e.g., the device 202) 24 or 72 hours. The processor 414 may also send one or more messages that indicate a different duration if the user performs a different activity (e.g., 1 hour of cycling, 30 minutes of running, or 5 minutes of having sex instead of taking 10,000 steps to achieve the same charge).

It should be appreciated that at least some of the components 302 to 310, 402 to 414, and 418 of FIGS. 3 and 4 may be included within the portable electronic device 202. For example, the portable electronic device 202 may be a smartphone that includes (or is otherwise integrated with) one or more magnet housings 304 and the circuitry 308. The battery of the smartphone may be charged by the magnet housing 304 in conjunction with the circuitry 308. Such a configuration enables the portable electronic device 202 to self-charge without a user having to separately carry the device housing 302.

In some embodiments, the smartphone may include two batteries. A first battery is configured to provide power to the smartphone and a second battery is configured to store charge from the magnet housings. The second battery, in conjunction with circuitry and/or logic is configured to charge the first battery when specified conditions are reached (e.g., a charge level of the first battery dropping to a specified threshold, a charge level of the second battery reaching a specified threshold, reception of an instruction from a user via a mechanical button or via an interface of the smartphone, when the smartphone is powered off, when the smartphone is in a sleep or non-use state, etc.). In some instances, the portable electronic device 202 may also be configured to charge other devices using the first and/or second battery.

Example Magnet Housing

Figure 5:
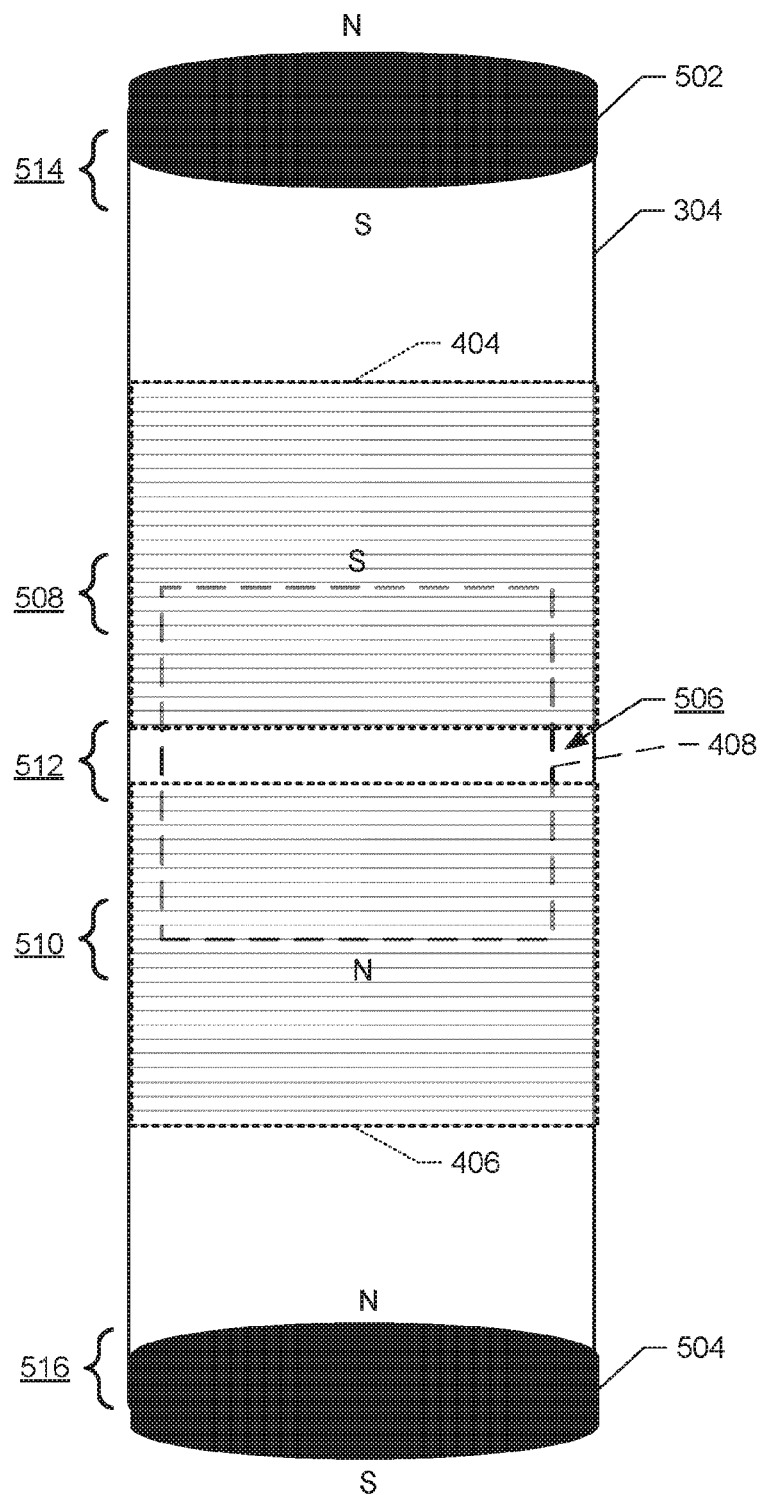
FIG. 5 shows a diagram of a magnet housing of the example kinetic energy harvesting device of FIGS. 1 to 4, according to an example embodiment of the present disclosure.

FIG. 5 shows a diagram of the example magnet housing 304 of FIGS. 3 and 4, according to an example embodiment of the present disclosure. The example magnet housing 304 is illustrated as having a tubular-shape with a height of about 2.5 inches and a diameter of 0.5 inches. The magnet housing 304 includes an inner surface (i.e., the inside of the tube) and an outer surface (i.e., the outside of the tube). It should be appreciated that the size and/or shape of the magnet housing may vary. For example, the magnet housing 304 may have a rectangular or block shape, a height anywhere between 0.1 to 200 inches, and/or a diameter anywhere between 0.1 to 50 inches. The size of the magnet 408 and the wire coils 404 and 406 may vary proportionally based on the dimensions of the magnet housing 304.

The example magnet housing 304 includes the wire coils 404 and 406, the central magnet 408, and end-cap magnets 502 and 504. The wire coils 404 and 406 are separated by a space 506 of the magnet housing 304. The wire coils 404 and 406 are configured to have heights similar to the height of the magnet 408 and are positioned such that, at rest, the top of the central magnet 408 is centered within a middle 508 of the wire coil 404 and the bottom of the central magnet 408 is centered within a middle 510 of the wire coil 406. The wire coils 404 and 406 may include any metal such as copper or gold and may or may not be insulated. In some instances, the wire coils 404 and 406 are wound around an outside surface of the magnet housing 304. In these instances, the magnet housing 304 may be covered by a plastic or film. In other instances, the wire coils 404 and 406 may be wound on an inner surface (or integrated inside) of the magnet housing 304. In yet alternative examples, the wire coils 404 and 406 may integrated with a separate piece of plastic that may be placed inside of the magnet housing 304 or around the outside of the magnet housing 304.

While the disclosure herein references the wire coils 404 and 406, it should be appreciated that other types of magnetic inductors may be used. For example, a solenoid or an inductor with a core may instead be used. In these examples, the core may be metallic and/or magnetic.

Also, while the wire coils 404 and 406 are shown as having heights similar to the central magnet 408, it should be appreciated that the heights of the wire coils 404 and 406 may vary. For instance, the heights of the wire coils 404 and 406 may be less than the central magnet 408 (e.g., half the height) or greater than the central magnet 408, such as the height shown in FIG. 4. Generally, the wire coil 404 may be placed anywhere between a center 512 of the magnet housing 304 and the end-cap magnet 502 and the wire coil 406 may be placed anywhere between the center 512 of the magnet housing 304 and the end-cap magnet 504, such as the placement shown in FIG. 4. Moreover, the wire coils 404 and 406 may include wires of any thickness or diameter and/or the spacing between individual wires within the wire coils 404 and 406 may range from 0.1 mm to tens of centimeters.

It should be appreciated that the top and bottom of the central magnet 408 has the strongest magnetic fields. The strongest current is accordingly induced within the coils 404 and 406 (or voltage across the coils 404 and 406) when the top or bottom of the central magnet 408 passes adjacent to or in proximity of the coils 404 and 406. In this configuration, even minimal perturbation of the central magnet 408 induces a current within the coils 404 and 406. If, for example, the heights of the coils 404 and 406 were smaller such that the ends of the central magnet 408 extended past the coils 404 and 406 at rest or during movement, much of the magnetic field of the central magnet 408 would not pass through the coils 404 and 406, thereby inducing a relatively low amount of current.

The example magnet housing 304 is connected to the end-cap magnets 502 and 504. The end-cap magnet 502 is connected to (or otherwise integrated with) a first end 514 of the magnet housing 304 and the end-cap magnet 504 is connected to a second end 516 of the magnet housing 304. The end-cap magnets 502 and 504 are configured to enclose the central magnet 408 within an inside of the magnet housing 304. The end-cap magnets 502 and 504 may be dimensioned to fit inside of the magnet housing 304. Alternatively, the end-cap magnets 502 and 504 may be configured to connect around an outside at the ends of the magnet housing 304.

The end-cap magnets 502 and 504 are configured to suspend the central magnet 408 within the magnet housing 304. For instance, the south-pole of the end-cap magnet 502 is configured to face the south-pole of the central magnet 408 while the north-pole of the end-cap magnet 504 is configured to face the north-pole of the central magnet 408. The magnetic field strengths of the end-cap magnets 502 and 504 is sufficient to oppose the similarly poled-sides of the central magnet 408, thereby causing the central magnet 408 to be suspended within the magnet housing 304. In some embodiments, the end-cap magnets 502 and 504 and the central magnet 408 are configured to have the same magnetic field strength. For instance, the end-cap magnets 502 and 504 and the central magnet 408 may be N52 neodymium magnets. In other embodiments, the end-cap magnet 504, which is at a bottom of the magnet housing 304 may be configured to have a greater field strength than the end-cap magnet 502 to overcome the downward gravitational pull on the central magnet 408.

FIGS. 6 and 7 show diagrams of current generation within the wire coils 404 and 406 as the central magnet 408 oscillates, according to an example embodiment of the present disclosure. During movement of a user, the central magnet 408, suspended within the magnet housing 304 oscillates vertically. FIG. 6 shows a diagram of the central magnet 408 moving upward and FIG. 7 shows a diagram of the central magnet 408 moving downward. As the central magnet 408 moves, a magnetic flux is generated around the wire coils 404 and 406. The flux experienced by the wire coil 404 is opposite in polarity from the flux experienced by the wire coil 406. The magnetic flux causes the wire coils 404 and 406, operating as inductors, to induce a current to flow and a voltage to form across each of the coils. The voltage across the wire coil 404 is opposite in polarity compared to the voltage across the wire coil 406. The wire coils 404 and 406 are accordingly wired to the rectifiers 402 appropriately such that the voltages are added rather than subtracted. In some instances, a voltage inverter may be electrically coupled to one of the wire coils 404 and 406 to enable the downstream voltages to be summed in series prior to being transmitted to the rectifier 402.

Figure 8:
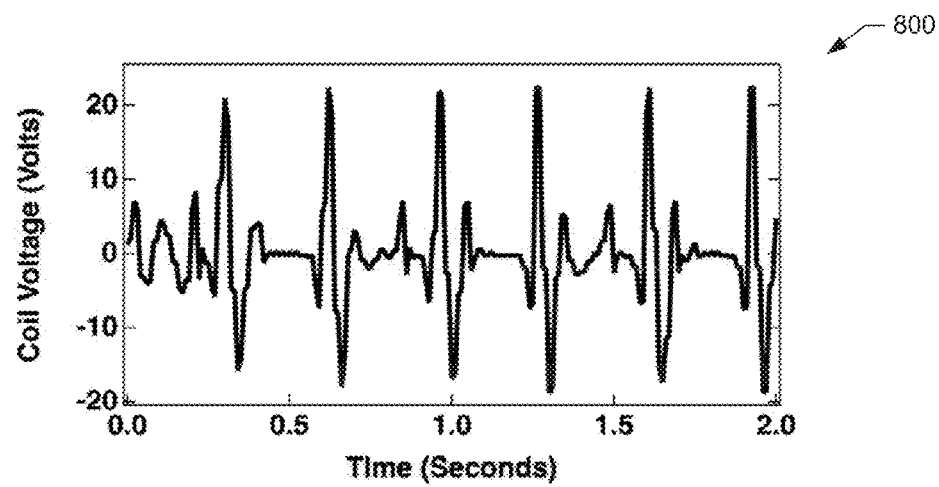
FIGS. 8 and 9 show diagrams of example graphs that show measured voltages across an example wire coil during a period of time, according to an example embodiment of the present disclosure.
Figure 9:
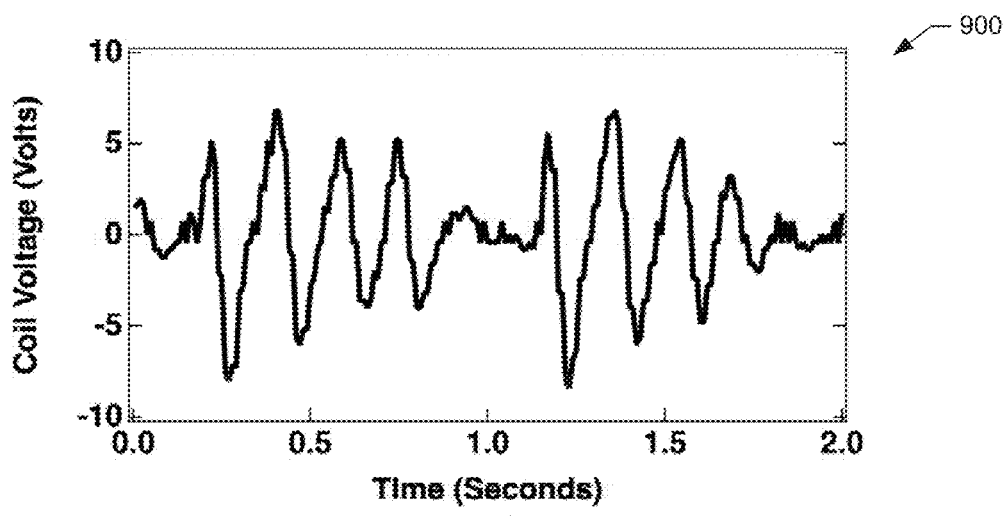

FIGS. 8 and 9 show diagrams of example graphs 800 and 900 that show a voltage measured across the wire coil 404 during a period of time, according to an example embodiment of the present disclosure. The graph 800 of FIG. 8 shows voltage across the wire coil 404 while a user is running and the graph 900 of FIG. 9 shows voltage across the same wire coil 404 while a user is walking. The voltage is positive as the central magnet 408 moves to the end-cap magnet 502 and is negative as the central magnet 408 moves toward the end-cap magnet 504. The amplitude of the voltage in the graph 900 is generally lower than the amplitude of the voltage in the graph 800 because the central magnet 408 oscillates at a slower speed (and/or moves less in each direction) when the user is walking compared to running. As discussed above, the rectifier 402 is configured to convert the AC voltage shown in the graphs 800 and 900 into a DC voltage for charging the battery 306. It should be appreciated that the wire coil 406 generates the same voltages as shown in the graphs 800 and 900 but at an opposite polarity.

Figure 10:
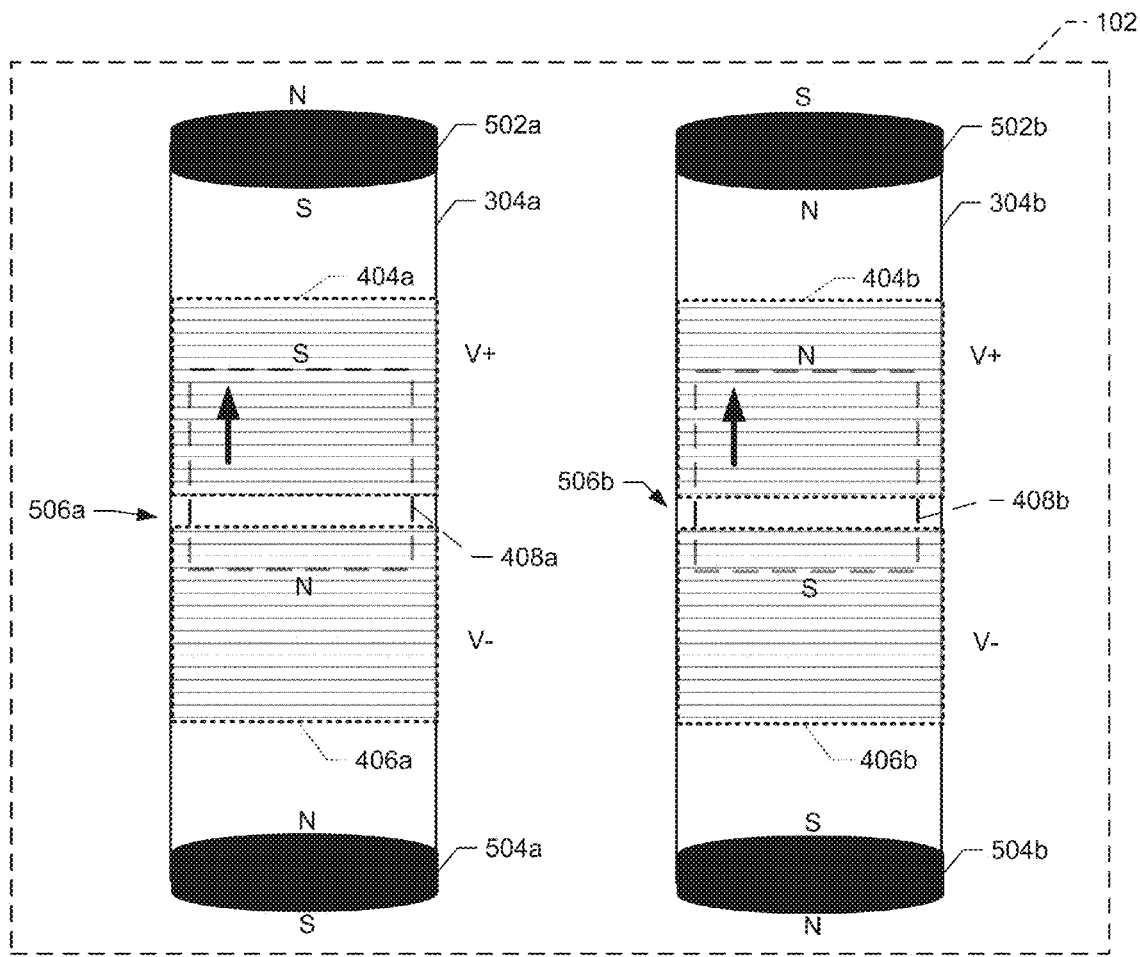
FIG. 10 shows a diagram of magnet housings within the kinetic energy harvesting device of FIGS. 1 to 7, according to an example embodiment of the present disclosure.

FIG. 10 shows a diagram of the magnet housings 304a and 304b within the kinetic energy harvesting device 102, according to an example embodiment of the present disclosure. As mentioned above, the magnet housing 304b is orientated such that the poles of the magnets 408b, 502b, and 504b are opposite in polarity than the poles of the magnets 408a, 502a, and 504a. Such a configuration facilitates magnetic coupling between the central magnets 408a and 408b so that they are attracted to each other and accordingly move/oscillate at the same time and in the same direction. This magnetic coupling may increase the amount of voltage generated since more magnetic force is applied to each of the coils 404 and 406. As discussed above, the wire coils 404a and 404b are connected in series and the wire coils 406a and 406b are separately connected in series to sum the similarly poled-voltages.

It should be appreciated that reversing the polarity of the central magnet 408b to match the polarity of the central magnet 408a in the vertical orientation causes the central magnets 408 to repel each other. This repelling force dampens oscillation speed. The repelling force also makes it very difficult to position both of the central magnets 408 at a center of the respective magnet housing 304 in a rest position.

Magnet Housing Embodiments

FIGS. 11 to 14 show diagrams of different configurations of the magnet housing 304 of FIGS. 3 to 10, according to example embodiments of the present disclosure. As mentioned above, the magnet housing 304 may be adjustable to change a speed and/or oscillation characteristic of the central magnet 408. The adjustments are made to the magnet housing 304 to optimize the speed or oscillation of the central magnet 304 based on a motion of a user. The adjustments may be made by a user based on, for example, an activity level or activity to be performed by the user. The adjustments may also be made by a user based on physical attributes or characteristics of the user. Additionally or alternatively, the adjustments may be made by a manufacturer of the kinetic energy harvesting device 102. For instance, a manufacturer may make a model of the device 102 optimized for high intensity activities (e.g., running, soccer, etc.), a model of the device 102 optimized for moderate intensity activities (e.g., speed walking, swimming, cycling, etc.), and/or a model of the device 102 optimized for low intensity activities (e.g., causal walking, sitting, sleeping, etc.).

Figure 14:
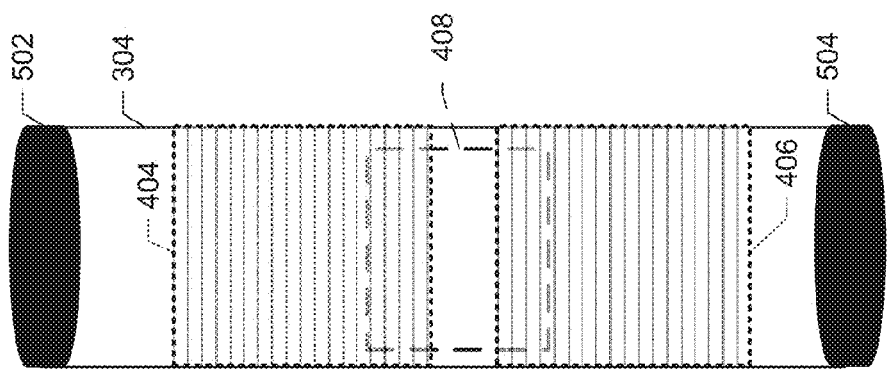
FIGS. 11 to 14 show diagrams of different configurations of a magnet housing, according to example embodiments of the present disclosure.
Figure 13:
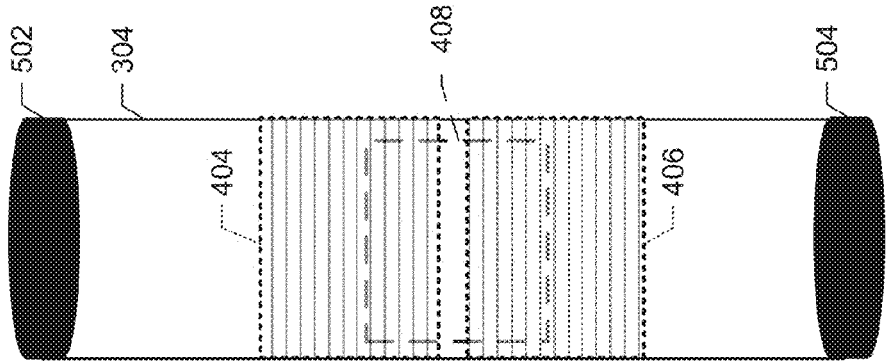
Figure 12:
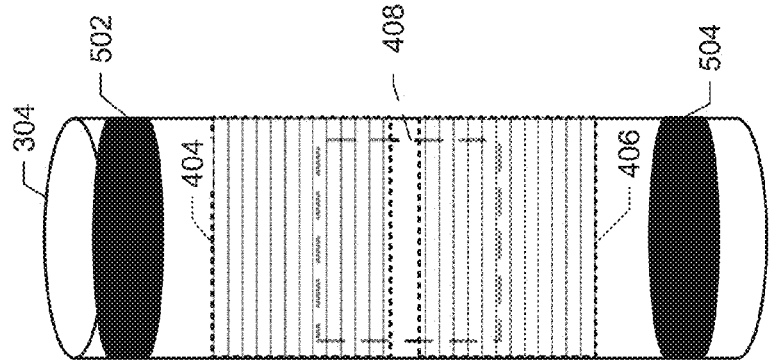
Figure 11:
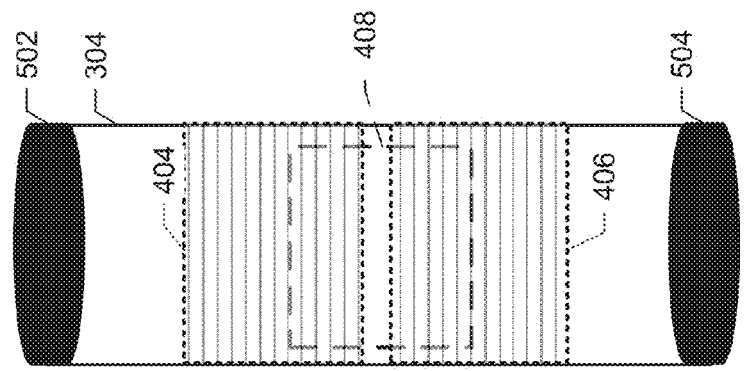

FIG. 11 shows a diagram of the unmodified magnet housing 304 of FIG. 5 for reference. FIGS. 12 to 14 show modifications that may be made to the magnet housing 304. In particular, FIG. 12 shows an adjustment that includes moving the end-cap magnets 502 and 504 toward a center of the magnet housing 304. The end-cap magnets 502 and 504 may be moved by a user sliding a lever or actuating a button on the magnet housing 304 and/or on an exterior of the device housing 302. The end-cap magnets 502 and 504 may also be moved by a user physically pushing the magnets 502 and 504.

Moving the end-cap magnets 502 and 504 closer to the center of the magnet housing 304 accounts for lower movement of the central magnet 408 corresponding to lower intensity activities. Alternatively, in some instances, the end-cap magnets 502 and 504 may be moved closer to the center of the magnet housing to dampen the speed and/or oscillation of the central magnet 408, which may be preferable for higher intensity activities where the central magnet 408 receives more kinetic energy.

FIG. 13 shows an adjustment that includes moving the end-cap magnets 502 and 504 away from a center of the magnet housing 304. A user may move the end-cap magnets 502 and 504 away from central magnet 408 by, for example, sliding a lever causing the height of the magnet housing 304 to expand (e.g., the magnet housing 304 may include a telescoping component). Alternatively, a user may connect different end-cap magnets that include tubing material connectable to the ends of the magnet housing 304, thereby extending the height of the magnet housing 304. A manufacturer may simply use a magnet housing 304 with a greater height. Moving the end-cap magnets 502 and 504 away from the center of the magnet housing 304 accounts for higher movement of the central magnet 408 corresponding to higher intensity activities. Alternatively, in some instances, the end-cap magnets 502 and 504 may be moved further from the center of the magnet housing to reduce a dampening force affecting the speed and/or oscillation of the central magnet 408, which may be preferable for lower intensity activities where the central magnet 408 receives less kinetic energy.

FIG. 14 shows an adjustment to the example discussed in conjunction with FIG. 13 that includes moving the wire coils 404 and 406. The wire coils 404 and 406 may be moved by a user, for example, sliding a lever. Alternatively, the wire coils 404 and 406 may be directly moved by a user. The wire coils 404 and 406 are adjustable to account for less or greater movement of the central magnet 408. As discussed, greater current is generated when the ends of the magnet 408 pass through or in proximity to the wire coils 404 and 406. Moving the wire coils 404 and 406 along a height of the magnet housing 304 helps ensure that the magnet 408 is within the wire coils 404 and 406 for a majority of the movement.

In addition to being moved, the example wire coils 404 and 406 are expanded in height to cover virtually all movement of the central magnet 408 for relatively intense activities where more movement is expected. In examples where the central magnet 408 is expected to have less movement, the wire coils 404 and 406 may be moved closer to a center of the magnet housing 304. Further, the wire coils 404 and 406 may be condensed together so the same amount of wire coils are traversed by the central magnet 408 with relatively less movement. The expansion/contraction of the wire coil height may be adjustable by a user via one or more levers accessible through the magnet housing 304 and/or the device housing 302. Alternatively, a user may directly expand or contract the wire coils 404 and 406. In yet alternative embodiments, a user (or a manufacturer) may add or remove wire coils to the magnet housing 304.

Magnet Embodiments

FIGS. 15 to 18 show diagrams of different configurations of the end-cap magnets 502 and 504 and the central magnet 408 of FIGS. 3 to 10, according to example embodiments of the present disclosure. The end-cap magnets 502 and 504 and/or the magnet housing 304 may be adjustable to change a speed and/or oscillation characteristic of the central magnet 408. The adjustments are made to optimize the speed or oscillation of the central magnet 304 based on a motion of a user. The adjustments may be made by a user based on, for example, an activity level or activity to be performed by the user. The adjustments may also be made by a user based on physical attributes or characteristics of the user. Additionally or alternatively, the adjustments may be made by a manufacturer of the kinetic energy harvesting device 102. For instance, a manufacturer may change the end-cap magnets 502 and 504 based on a rated intensity level of the device 102.

FIG. 15 shows a diagram of the unmodified magnet housing 304 and end-cap magnets 502 and 504 of FIG. 5 for reference. FIGS. 16 and 17 show diagrams of modifications that may be made to the end-cap magnets 502 and 504. In particular, FIG. 16 shows that a user (or manufacturer) may replace the end-cap magnets 502 and 504 with end-cap magnets 1602 and 1604 that have a different size and/or magnetic field strength. The use of the stronger end-cap magnets 1602 and 1604 may constrain the central magnet 408 for relatively high or low intensity activities. The end-cap magnets 502 and 504 are replaced by removing or disconnecting the magnets 502 and 504 from the magnet housing 304 and connecting the magnets 1602 and 1604. It should be appreciated that the wire coils 404 and 406 may be reduced in height to match the constrained movement of the central magnet 408, as discussed in conjunction with FIG. 14.

FIG. 17 shows a diagram where second end-cap magnets 1702 and 1704 are added to already connected end-cap magnets 502 and 504. The addition of the second end-cap magnets 1702 and 1704 increases the magnetic field strength, similar to adding the stronger end-cap magnets 1602 and 1604 in FIG. 16. The second end-cap magnets 1702 and 1704 may be magnetically and/or mechanically coupled to the respective magnets 1502 and 1504. Alternatively, the end-cap magnets 1702 and 1704 may be connected to an exterior of the device housing 302 while still being aligned with the end-cap magnets 502 and 504 to enable a user to easily configure the kinetic energy harvesting device 102. For instance, the device housing 302 may include one or more slots or recessed portions to accommodate and secure the end-cap magnets 1702 and 1704. The slots or recessed portions are aligned with the internally located end-cap magnets 502 and 504, thereby increasing the magnetic field strength. It should also be appreciated that the addition of some end-cap magnets may reduce the magnetic field strength.

In some embodiments, the strength of the end-cap magnets 502 and 504 may be adjusted electronically rather than physically. For instance, the end-cap magnets 502 and 504 may be connected to an electrical circuit configured to control the magnetic strength of the magnets 502 and 504. A user may select a button on the outside of the device housing 102 or electronically via the devices 202 or 416, which causes the electrical circuit to accordingly increase or decrease the magnetic field strength of the end-cap magnets 502 and 504. The button or electronic setting may include, for example, an activity level or desired activity type to be performed by the user, which causes, for example, the processor 414 of FIG. 4 to determine an appropriate magnetic field strength and accordingly tune or set the magnetic field strength of end-cap magnets 502 and 504.

FIG. 18 shows a diagram of the example magnet housing 304 including two central magnets 1802 and 1804 that are aligned with respective wire coils 1806, 1808, 1810, and 1812. The wire coils 1806 and 1810 may be connected in series and the wire coils 1808 and 1812 may separately be connected in series. The central magnets 1802 and 1804 are aligned so that they operate as an end-cap of each other. For instance, the oppositely facing ends of the central magnets 1802 and 1804 have the same polarity to ensure the magnets 1802 and 1804 remain separated by a predetermined distance while still being able to move or oscillate in the same direction at the same speed. The damping caused by the use of the two central magnets 1802 and 1804 is offset by the increased energy output of the additional magnet and wire coils.

It should be appreciated that the dimensions of the central magnet 408 may change based on application, technology, etc. For example, the central magnet 408 may have a height, width, and/or thickness with nano-dimensions or micro-dimensions. Alternatively, the central magnet 408 may have a height, width, or thickness that ranges from a few centimeters or inches to hundreds of inches. FIG. 19 shows a diagram where an array of relatively small central magnets is used within a device housing and/or one or more magnet housings, according to example embodiments of the present disclosure. The kinetic energy harvesting device 102 may accommodate an array of the magnet housings 304 to increase an amount of kinetic energy captured. The central magnets may be positioned and/or spaced to facilitate magnetic coupling so that they move at the same speed in the same direction. The array of magnet housings may charge one or more batteries. For example a top portion of the array may charge a first battery and a bottom portion of the array may charge a second battery that is electrically parallel to the first battery.

CONCLUSION

It should be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A kinetic energy harvesting apparatus comprising:
a first magnet housing and a second magnet housing each configured to have a tubular shape and include:
a first end-cap magnet configured to connect to a first end of the magnet housing;
a second end-cap magnet configured to connect to a second end of the magnet housing;
a first wire coil configured to be connected to the magnet housing between the first end and a center of the magnet housing;
a second wire coil configured to be connected to the magnet housing between the second end and the center of the magnet housing; and
a central magnet configured to be located within the magnet housing between the first end and the second end such that a north-pole end of the central magnet faces a north-pole of the first end-cap magnet and a south-pole end of the central magnet faces a south-pole of the second end-cap magnet causing the central magnet to be suspended between the first and second end-caps of the magnet housing,
wherein the first wire coil has a first height along the respective magnet housing and includes a first center, with respect to the first height along the respective magnet housing, that is positioned adjacent to the north-pole end of the central magnet when the central magnet is at rest,
wherein the second wire coil has a second height along the respective magnet housing and includes a second center, with respect to the second height along the respective magnet housing, that is positioned adjacent to the south-pole end of the central magnet when the central magnet is at rest, and
wherein the central magnets of the first and second magnet housings are positioned such that the north-pole of the central magnet of the first magnet housing is vertically aligned in parallel with the south-pole of the central magnet of the second magnet housing when the central magnets are at rest or are moving through the respective magnet housings.

2. The apparatus of claim 1, wherein the first wire coil and the second wire coil are configured to be internal to the magnet housing and include insulated wire.

3. The apparatus of claim 1, wherein a combination of the first height and the position of the first wire coil is configured to enable the first end of the central magnet to pass through the first wire coil while concurrently enabling the second end of the central magnet to pass through the second wire coil.

4. The apparatus of claim 1, wherein the second end-cap magnet has a greater magnetic field strength than the first end-cap magnet to compensate for Earth's gravity.

5. The apparatus of claim 1, wherein the first and the second end-cap magnets and the central magnet each include a N52 Neodymium magnet.

6. The apparatus of claim 1, wherein the first and second end-cap magnets have less field strength than the central magnet.

7. The apparatus of claim 1, wherein the magnet housing has a height between 0.25 and 6 inches.

8. The apparatus of claim 1, wherein the first height and the second height along the respective magnet housing are each substantially equal to a height of the respective central magnet.

9. A kinetic energy harvesting apparatus comprising:
first and second tubular-shaped magnet housings that each include:
a first end-cap magnet configured to connect to a first end of the magnet housing;
a second end-cap magnet configured to connect to a second end of the magnet housing;
a first wire coil configured to be connected to the magnet housing between the first end and a center of the magnet housing;
a second wire coil configured to be connected to the magnet housing between the second end and the center of the magnet housing; and
a central magnet configured to be suspended within the magnet housing between the first end and the second end such that a north-pole end of the central magnet faces a north-pole of the first end-cap magnet and a south-pole end of the central magnet faces a south-pole of the second end-cap magnet,
wherein the central magnets of the first and second tubular-shaped magnet housings are positioned such that the north-pole of the central magnet of the first tubular-shaped magnet housing is vertically aligned in parallel with the south-pole of the central magnet of the second tubular-shaped magnet housing when the central magnets are at rest or are moving through the respective tubular-shaped magnet housings.

10. The apparatus of claim 9, wherein at least one of the first end-cap magnet and the second-end cap magnet is detachable from the magnet housing.

11. The apparatus of claim 10, wherein a third-end cap magnet may replace at least one of the detachable first-end cap magnet and the detachable second-end cap magnet, the third-end cap magnet having a different field strength than the first-end cap magnet and the second end-cap magnet.

12. The apparatus of claim 11, wherein the third-end cap magnet is used to replace at least one of the first-end cap magnet and the second-end cap magnet to change a speed and oscillation of the central magnet to correspond to a user's activity.

13. The apparatus of claim 11, wherein the third-end cap magnet is used to replace at least one of the first-end cap magnet and the second-end cap magnet to change a speed and oscillation of the central magnet to correspond to a user's physical attributes.

14. The apparatus of claim 9, wherein a third-end cap magnet may be connected to at least one of the first-end cap magnet and the second-end cap magnet to change a speed or an oscillation of the central magnet.

15. The apparatus of claim 9, wherein a location of at least one of the first wire coil and the second wire coil is adjustable along the magnet housing.

16. The apparatus of claim 9, wherein the first wire coil has a height along the respective magnet housing and includes a first center, with respect to the height along the respective magnet housing, that is positioned adjacent to the north-pole end of the respective central magnet when the central magnet is at rest.

17. A kinetic energy harvesting apparatus comprising:
 a first tubular magnet housing including:
  a first end-cap magnet configured to connect to a first end of the magnet housing,
  a second end-cap magnet configured to connect to a second end of the magnet housing,
  a first wire coil configured to be connected to the magnet housing between the first end and a center of the magnet housing,
  a second wire coil configured to be connected to the magnet housing between the second end and the center of the magnet housing, and
  a central magnet configured to be located within the magnet housing between the first end and the second end such that a north-pole of the central magnet faces a north-pole of the first end-cap magnet and a south-pole of the central magnet faces a south-pole of the second end-cap magnet causing the central magnet to be suspended between the first and second end-caps of the magnet housing;
 a second tubular magnet housing including:
  a first end-cap magnet configured to connect to a first end of the magnet housing,
  a second end-cap magnet configured to connect to a second end of the magnet housing,
  a first wire coil configured to be connected to the magnet housing between the first end and a center of the magnet housing,
  a second wire coil configured to be connected to the magnet housing between the second end and the center of the magnet housing, and
  a central magnet configured to be located within the magnet housing between the first end and the second end such that a north-pole of the central magnet faces the north-pole of a first end-cap magnet and a south-pole of the central magnet faces a south-pole of the second end-cap magnet causing the central magnet to be suspended between the first and second end-caps of the magnet housing;
 a battery; and
 a circuitry configured to:
  rectify an AC voltage generated by the first and second wire coils of the first and second tubular magnet housings into a DC voltage, and
  charge the battery using the DC voltage,
  wherein the central magnets of the first and second tubular magnet housings are positioned such that the north-pole of the central magnet of the first tubular magnet housing is vertically aligned in parallel with the south-pole of the central magnet of the second tubular magnet housing when the central magnets are at rest or are moving through the respective tubular magnet housings.

18. The apparatus of claim 17, further comprising a device housing configured to enclose the first tubular magnet housing, the second tubular magnet housing, the battery, and the circuitry.

19. The apparatus of claim 17, wherein the first wire coils of the first tubular magnet housing and the second tubular magnet housing are configured to be wired in series and the second wire coils of the first tubular magnet housing and the second tubular magnet housing are configured to be separately wired in series.

20. The apparatus of claim 17, wherein the central magnets of the first and second tubular magnet housings are configured to each have a height along the respective tubular magnet housings that is substantially equal to a height of the respective first wire coils.

21. The apparatus of claim 17, wherein the central magnets of the first and second tubular magnet housings are configured to be magnetically coupled to move in the same direction at the same time to increase the amount of voltage summed by the circuitry.

22. The apparatus of claim 17, wherein the circuitry is configured to:
 detect an electrical connection to a device; and
 charge the device using the battery.

23. The apparatus of claim 17, wherein the circuitry is configured to:
 determine a current charge of the battery;
 determine a rate at which the battery is being charged; and
 transmit the current charge state and the rate to a user device.

24. The apparatus of claim 17, wherein the kinetic energy harvesting apparatus is included within a portable electronic device.

25. The apparatus of claim 16, wherein the height of the first wire coil is substantially equal to a height of the central magnet.

* * * * *